March 7, 1944.  W. M. GEARHART  2,343,658

THERMOPLASTIC DECORATIVE COMPOSITION AND PROCESS OF PREPARATION

Filed Nov. 18, 1939

Inventor
William M. Gearhart

By N. M. Perrins
Daniel J. Mayne
Attorneys

Patented Mar. 7, 1944

2,343,658

UNITED STATES PATENT OFFICE 2,343,658

THERMOPLASTIC DECORATIVE COMPOSITION AND PROCESS OF PREPARATION

William M. Gearhart, Kingsport, Tenn., assignor to Eastman Kodak Company, Rochester, N. Y., a corporation of New Jersey Application November 18, 1939, Serial No. 305,156

4 Claims. (Cl. 260—13)

This invention relates to decorative thermoplastic compositions and more particularly to the production of cellulose organic acid ester products having nacreous or pearlessence effects.

Heretofore, various nacreous producing materials have been added to thermoplastic compositions to produce an irridescent and mother of pearl decorative appearance. Such materials as fish scale essence or imitation pearlessence such as silky mercurous chloride and silky lead iodide are commonly employed. In some processes a nacreous effect can be achieved with the addition of fine metallic particles or mica flakes to the thermoplastic composition.

An object of the present invention is a new process for producing pearlessence effects in thermoplastic materials.

Another object of the invention is the novel employment of thermoplastic resins of limited compatability with cellulose esters for producing the pearlessence effects.

A further object of the invention is a cellulose composition having a nacreous decorative appearance in which the nacreous effect is caused by the presence of finely divided particles of a resin in an amount in slight excess over that amount which is soluble in the ester.

Figure 1:
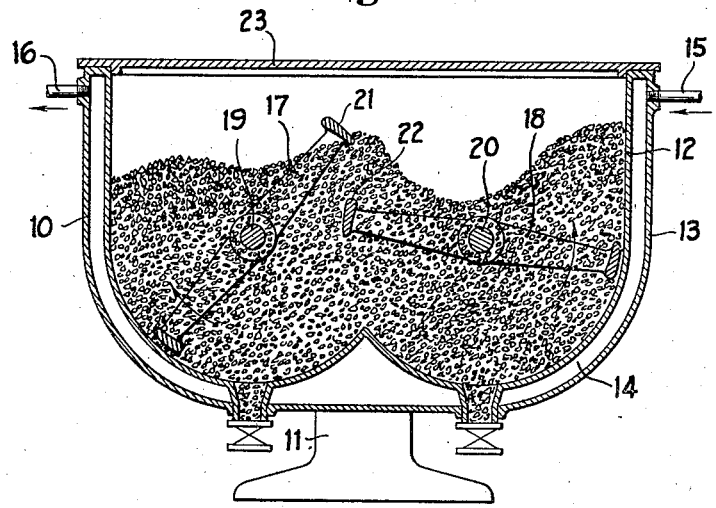
Figure 2:
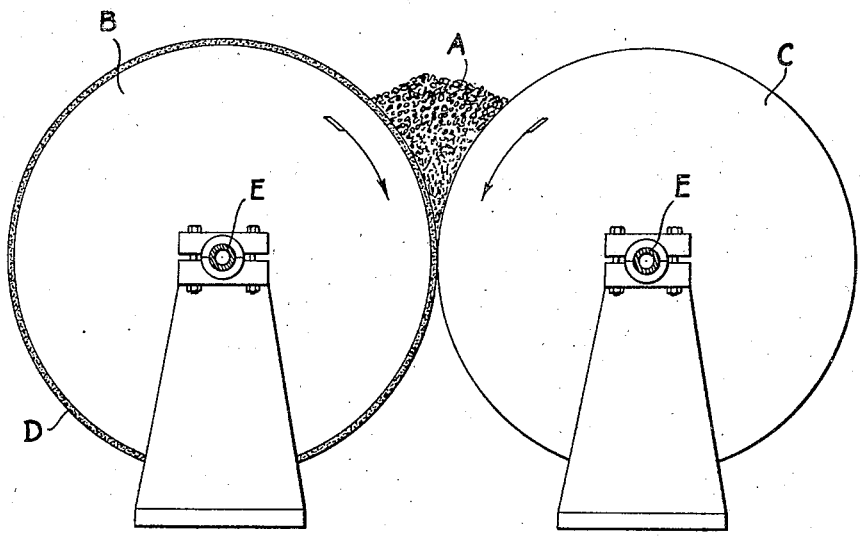

The invention will be more clearly understood by referring to the drawing in which Fig. 1 is a sectional elevational view of the preferred mixing device and Fig. 2 is a view in elevation of the colloidizing rolls in the operation of rolling a plastic mass.

In accordance with the invention these and other objects are attained by forming a thermoplastic moldable material from a suitable cellulose organic acid ester and a thermoplastic resin of limited compatibility with the ester. I have found by incorporating various thermoplastic resins of limited compatibility in cellulose organic acid esters in amounts just beyond the maximum compatibility very pleasing pearlessence effects are attained. Preferably the composition also contains plasticizer. While the exact phenonema is not understood and I do not wish to be limited to my assumption, I believe that the pearlessence is caused by the uneven light reflection or absorption properties of the molded article due to the varied distribution of the resin particles thru different planes and axes of the more or less transparent article. It is significant to note that neither a colloidized cellulose ester or the thermoplastic resin per se exhibit pearlessence before mixing. It is further surprising that the resins will produce a pearlessence effect since the resins are amorphous materials and not crystalline, as are the common nacreous producing materials mentioned above.

I prefer to mix the cellulose ester and resin together with plasticizer in a sigma blade mixer. The temperature of the mixture may be suitably controlled to promote homogeneous mixing of the plasticizer throughout the mix. The mix is then transferred to and worked between a pair of heated milling rolls. One of these rolls, at least is maintained above the temperature of boiling water and more particularly within a range of from approximately 212° F. to 370° F. Preferably the temperature of one roll is maintained approximately 100° F. or more higher than the other so that the composition will gradually collect thereon. The milling action of these rolls will assure substantially uniform distribution of the resin throughout the cellulose ester and will also reduce the moisture content of the composition to less than 0.5%. After a few minutes rolling the mix changes to a colloidized composition. The rolling is continued until the composition collects on the hotter roll from which it is then cut in the form of a thick rough slab. This slab exhibits pearlessence and the pearlessence effect may be accentuated by pressing the rough slab in a platen press into a smooth slab of uniform thickness. Or the rough slab may be comminuted into particles of substantially uniform size which are suitable for injection or extrusion molding. The wiping action of the extrusion nozzle and the somewhat similar effect of the composition passing into the injection mold will further accentuate the nacreous effect in the extruded or molded article.

My process is applicable to the various cellulose organic acid esters such as cellulose acetate, cellulose propionate, cellulose butyrate, cellulose acetate propionate, cellulose acetate butyrate or even higher cellulose organic acid derivatives.

I have found that the following thermoplastic resins which are sold in the market are the type which will produce pearlessence effects in a thermoplastic cellulose organic acid ester if added in excess in proper porportions: "cumar," a copolymer of cumarone and indene; "Nevidene," a polymerized hydrocarbon composition, "Alvar," a polyvinyl acetaldehyde acetal resin; "Teglac," an abietic acid modified alkyd resin.

The proportion of the resin to cellulose ester depends upon the compatibility of the resin used and the amount of plasticizer present. A range of from 0.5 to 30 parts of resin per 100 parts of cellulose ester will produce a satisfactory number of different nacreous effects altho in some instances more resin may be desirable.

Suitable plasticizers for use with the above are dimethyl phthalate, diethyl phthalate, diamyl phthalate, dibutyl phthalate, benzyl lactate, triacetin, tripropionin, ethylene glycol diacetate, diethylene glycol diacetate, triethylene diacetate, ethylene glycol dipropionate and glyceryl chloro dipropionate.

In the following examples and related description, I have set forth several of the preferred embodiments of my invention, but it is to be understood that they are included merely for the purposes of illustration and not as a limitation thereof.

The method of the invention may be conveniently carried out in any type of mixing apparatus, preferably provided with means for cooling or heating the mix to a desired temperature and with means for mechanically agitating the material sufficiently to bring the plasticizer into intimate contact with the cellulose ester and to disperse the resin particles uniformly throughout the mix. A conventional form of such a device is illustrated in Fig. 1.

As shown in this drawing the mixer comprises a mixing vessel 10 suitably mounted upon a base 11 and having double walls 12 and 13 providing a jacket 14 for the circulation of cooling or heating fluid. The jacket 14 is supplied with fluid by means of inlet conduit 15, while the outlet conduit 16 conveys the cooling fluid therefrom. The numerals 17 and 18 designate mechanical mixing devices mounted on rotatable shafts 19 and 20 respectively, driven by a source of power (not shown) and provided with blades 21 and 22 for cutting through the mass undergoing mixing and of so manipulating it that all parts of the cellulose derivative material are intimately brought in contact with the plasticizer. A cover 23 is conveniently provided so that the temperature of the device may be more effectively controlled and in order that the operation may be carried out with no loss or contamination of material.

*Example I*

100 parts by weight of cellulose acetate butyrate ground to a particle size corresponding to approximately 80 mesh is placed in the above described mixer together with 20 parts of diamyl phthalate, the plasticizer is introduced at a temperature of about 15° C. and the temperature of the mix is maintained at about 15° C. by circulation of water cooled at or below this temperature thru the jacket to prevent any action by the plasticizer on the acetate during the preliminary mixing. The mixture of cellulose acetate butyrate and diamyl phthalate is then subjected to mechanical mixing for a short time by revolution of the blades of the mixing device which cut thru the mass and continuously turn it over and expose new surfaces for contact with the plasticizer. While still maintaining the temperature of the mix below that at which colloidization between the plasticizer and cellulose ester occurs, 20 parts of powdered "cumar" resin are added to the cellulose ester and plasticizer and the mixing continued until all these substances are quite uniformly mixed. The temperature of the mix is then permitted to rise to room temperature at which point plasticization of the mix occurs.

This plasticized mixture is then transferred to the heated rolls shown in Fig. 2 in which the composition shown at A is kneaded between the heated and driven hollow rolls B and C until the plasticizer and cellulose ester are homogenously colloidized and the resin particles are uniformly distributed throughout the colloidized composition. Both rolls may be driven or only roll B. Heat is supplied to the rolls by means of steam, water, or oil, as well known with such apparatus. The driven roll B is preferably maintained at a temperature of 100° F. higher than roll C and both rolls are maintained within the range of 212° F. to 370° F. The composition will gradually accumulate on the hotter roll B and at the end of the operation the accumulated layer can be removed from this roll. One of the rolls, preferably the idler roll if only one is driven, is on an adjustable axis so that the gap thru which the material must pass may be varied to correspondingly vary the pressure applied to the material during the kneading operation. In addition to colloidizing the composition this hot rolling operation drives off moisture from the composition and thereby eliminates a common source of deterioration and warping.

When the composition is removed it is in the form of a rough slab but owing to the distribution of the resin particles thruout the slab it will present a nacreous appearance.

This slab or suitable portions thereof may then be transferred to a heated platen press and pressed into smooth slabs of uniform dimensions which can be employed in compression molding.

If a colored composition is desired dyes, pigments and lakes may be added to the composition either during the preliminary mixing or during the hot rolling operation. It is also in the contemplation of the invention to employ with the resin particles the common nacreous forming materials such as metal powders, metal flakes, mica dust, silky mercurous chloride, silky mercurous iodide or real mother of pearl. These may be added as a distinct material or incorporated into a compatible cellulose ester composition and pieces of this composition added to the base composition while it is being hot rolled.

Rods, sheets, and tubes of the composition having the nacreous effect can be extruded from suitable extrusion apparatus.

The composition can also be employed in injection molding in which case either the unpressed or pressed slab may be comminuted into a size suitable for use in the injection molding machine.

*Example II*

100 parts by weight of cellulose acetate butyrate, 10 parts of diamyl phthalate and 20 parts of "Alvar" resin are mixed as above described and rolled on the hot rolls until thoroughly colloidized. This composition will give an attractive nacreous appearance when compression, extrusion or injection molded.

*Example III*

100 parts by weight of cellulose acetate butyrate, 5 parts of diamyl phthalate and 20 parts of "Teglac" are mixed as above described and rolled on the hot rolls to produce colloidization.

*Example IV*

100 parts by weight of cellulose acetate butyrate, 15 parts diamyl phthalate, and 20 parts of "Nevidene" are mixed and rolled as described in Example I to produce pleasing nacreous effects in the composition.

*Example V*

100 parts by weight of cellulose acetate butyrate, 20 parts of dibutyl phthalate and 20 parts of "Teglac" are mixed and rolled as above described to produce a colloidized thermoplastic material exhibiting pearl effects.

*Example VI*

100 parts of cellulose acetate and 35 parts of tripropionin are thoroughly mixed in the sigma blade mixer and 20 parts of "Nevidene" are then added, the mixing being continued to distribute the resin uniformly in the composition. The mix is then colloidized on the hot rolls as previously described and there results a nacreous appearing thermoplastic material.

It will be understood, as above indicated, that in general a composition made by my novel method of producing nacreous effects may be employed as a base material in other known processes for producing decorative thermoplastic materials, the decorative effect due to my novel composition being more or less accentuated depending on methods of working, molding and the like as well as the introduction into the composition of dyes, pigments and other effect materials. However, as set forth in the following claims I believe that I have discovered a new method for making a nacreous appearing composition which in itself is also novel.

I claim:

1. The process of forming a decorative thermoplastic molding material having a nacreous appearance which consists in mixing a synthetic thermoplastic resin having limited compatibility in cellulose organic acid esters with a cellulose organic acid ester and plasticizer, the amount of the resin being in excess of the maximum solubility of the resin in the plasticized ester whereby a nonhomogeneous mixture is produced resulting in a composition which when molded under heat and pressure presents a nacreous appearance.

2. The process of forming a decorative thermoplastic molding material having a nacreous appearance which consists in mixing a synthetic thermoplastic resin having limited compatibility in cellulose organic acid esters with cellulose acetate butyrate ester and plasticizer, the amount of the resin being in excess of the maximum solubility of the resin in the plasticized ester whereby a non-homogeneous mixture is produced resulting in a composition which when molded under heat and pressure presents a nacreous appearance.

3. The process of forming a decorative thermoplastic molding material having a nacreous appearance which consists in mixing a synthetic thermoplastic resin having limited compatibility in cellulose organic esters with cellulose acetate butyrate ester and a dialkyl phthalate plasticizer, the amount of the resin being in excess of the maximum solubility of the resin in the plasticized ester whereby a non-homogeneous mixture is produced resulting in a composition which when molded under heat and pressure presents a nacreous appearance.

4. A decorative thermoplastic molding composition having a nacreous appearance consisting of a synthetic thermoplastic resin having limited compatibility in plasticized cellulose organic acid esters distributed through a plasticized cellulose acetate butyrate in an amount exceeding said limited compatibility whereby the excess resin appears in discrete particles in the butyrate and aids in producing said nacreous appearance.

WILLIAM M. GEARHART.